United States Patent
Lew

(10) Patent No.: US 8,815,201 B2
(45) Date of Patent: *Aug. 26, 2014

(54) PROCESS FOR REGENERATING A REFORMING CATALYST

(75) Inventor: Lawrence E. Lew, Napa, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/477,449

(22) Filed: May 22, 2012

(65) Prior Publication Data

US 2012/0270724 A1    Oct. 25, 2012

(51) Int. Cl.
| | |
|---|---|
| *B01J 38/12* | (2006.01) |
| *B01J 38/02* | (2006.01) |
| *B01J 38/10* | (2006.01) |
| *B01J 38/14* | (2006.01) |
| *C10G 35/04* | (2006.01) |
| *B01J 23/96* | (2006.01) |
| *B01J 38/44* | (2006.01) |

(52) U.S. Cl.
CPC . *B01J 38/12* (2013.01); *B01J 23/96* (2013.01); *B01J 38/02* (2013.01); *B01J 38/10* (2013.01); *C10G 2400/02* (2013.01); *B01J 38/14* (2013.01); *C10G 2300/708* (2013.01); *C10G 35/04* (2013.01); *B01J 38/44* (2013.01)
USPC .......................................... 423/347; 423/344

(58) Field of Classification Search
CPC ................................ B01J 38/12; B01J 38/10
USPC .................................................. 423/347, 344
See application file for complete search history.

(56) References Cited

U.S. PATENT DOCUMENTS

| | | |
|---|---|---|
| 2,368,507 A | 1/1945 | Welty |
| 2,853,435 A | 9/1958 | Evering et al. |
| 3,230,179 A | 1/1966 | Schwarzenbek |
| 3,248,338 A | 4/1966 | Decker |
| 3,625,860 A | 12/1971 | Condrasky et al. |
| 3,986,982 A | 10/1976 | Crowson et al. |
| 4,251,392 A | 2/1981 | Mauldin et al. |
| 4,595,703 A | 6/1986 | Payne et al. |
| 5,155,075 A | 10/1992 | Innes et al. |
| 5,453,558 A | 9/1995 | Alexander et al. |
| 5,866,495 A | 2/1999 | Fung et al. |
| 6,291,381 B1 | 9/2001 | Lin et al. |
| 6,472,340 B2 | 10/2002 | Lin |
| 8,372,770 B2 * | 2/2013 | Lew ................................ 502/38 |
| 2007/0142486 A1 | 6/2007 | Limerkens et al. |
| 2010/0152021 A1 | 6/2010 | Lew |

OTHER PUBLICATIONS

Antos, et el., Catalytic Naphtha Reforming, 2nd, illustrated, CRC Press, 2004, New York, NY, 0824757122, 9780824757120, Chapter 11.
PCT International Search Report and Written Opinion, International Application No. PCT/US2013/040932, dated Aug. 8, 2013.

* cited by examiner

*Primary Examiner* — Edward Johnson
(74) *Attorney, Agent, or Firm* — Michael D. Ross

(57) ABSTRACT

The present invention is directed to an in situ process for regenerating a reforming catalyst within a reactor by:
  (a) removing a carbon containing deposit from the reforming catalyst,
  (b) contacting the reforming catalyst with oxygen under catalyst rejuvenation conditions to provide a rejuvenated catalyst,
  (c) purging a portion of the oxygen from the rejuvenated catalyst such that residual oxygen is retained within the reactor, and
  (d) introducing hydrogen into the reactor at a rate to provide a reactor temperature increase in the range from 25 to 45° F.

12 Claims, 1 Drawing Sheet

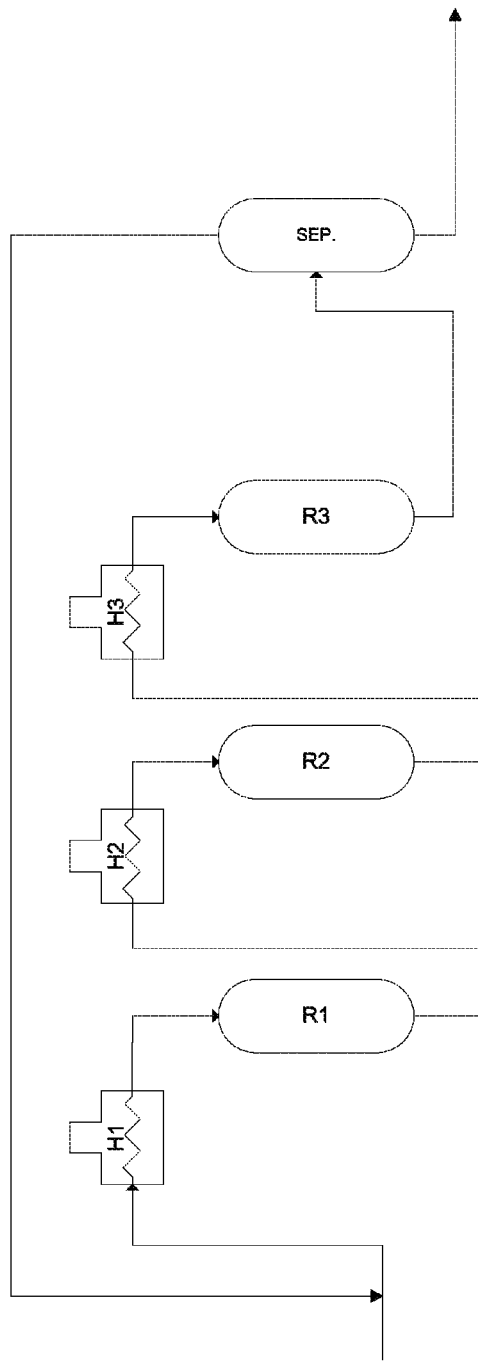

PROCESS FOR REGENERATING A REFORMING CATALYST

FIELD OF THE INVENTION

The present invention relates to a process for regenerating reforming catalysts.

BACKGROUND OF THE INVENTION

Catalytic reforming of naphtha feedstock to is an important, well known process in the petroleum refining industry. Most naphtha feedstocks have low octane numbers because they contain large quantities of naphthenes and paraffins. In catalytic reforming, these components go through a variety of hydrocarbon conversions to produce in a gasoline product having a higher octane number.

Some of the more important conversion reactions include dehydrogenation of naphthenes to aromatics, and dehydrocyclization of normal paraffins to aromatics. Less desirable reactions which commonly occur include hydrocracking of paraffins and naphthenes, which produces low-value gaseous hydrocarbons (also referred to as "light ends") such as methane and ethane. Due to these less desirable reactions, an important objective of catalytic reforming is to rearrange the structure of the hydrocarbon molecules to form higher octane products without any significant change in the carbon number distribution of the stock (e.g. to minimize the formation of light end products).

Referring to FIG. 1, in a typical reforming operation, the process is carried out in a series of reforming reactors (R1, R2, R3). Each reforming reactor is generally provided with a fixed bed of catalyst that receives and catalyzes vaporized naphtha in the presence of hydrogen, at an elevated pressure and temperature ("reforming conditions"). Feed heaters (H1, H2, H3) disposed between the reactors because the reforming reactions are endothermic. The effluent from the last reactor (R3) is separated into a liquid product and a hydrogen-rich vaporous effluent. The vaporous effluent is used as recycle gas in the reforming process.

Catalytic reforming processes use catalysts having one or more dehydrogenation-promoting metals dispersed on a porous support, such as chlorinated alumina. During the reforming operation, the activity of the reforming catalyst gradually declines due to the build-up of coke (typically over a period of 5-24 months), and the temperature of the reactor must be raised to compensate for the loss in catalytic activity. Eventually, economics dictate the necessity of interrupting the reforming process in order to regenerate the catalyst. At the end of run, naphtha reforming operations are discontinued, feed is removed from the reforming unit, and the reforming catalyst is regenerated in-situ using a specific regeneration and startup procedure.

In a conventional catalyst regeneration processes, the catalyst is regenerated in situ (e.g. in the reactor without moving the reforming catalyst). To regenerate a reforming catalyst in situ, the following sequential steps are typically employed. (See, Antos and Aitani, Catalytic Naptha Reforming, $2^{nd}$ Edition, 2004, pages 433-457).

1. Reactor Purge: After the reforming operations are discontinued and feed is removed from the reactor, an inert gas (e.g. recycle gas, nitrogen) is used to purge/remove residual hydrocarbon material and hydrogen from the reactor.

2. Coke Burn: Coke deposited on the catalyst is burned, typically at temperatures of greater than 725° F. (385° C.), in the presence of a gas consisting of an inert gas such as nitrogen, and air (as an oxygen source needed to burn off the carbon).

3. Catalyst Rejuvenation (Oxidation): The catalyst hydrogenation metals often agglomerate as a result of sintering during the coke burn step. The metals are re-disbursed by subjecting the catalyst to chlorine under a full-air atmosphere.

4. Oxygen Purge: Following rejuvenation, the system is purged of water and oxygen. This step is traditionally conducted at low temperature (400° F., 204° C.) and low pressure (<50 psig, <446 kpa) using an inert gas such as nitrogen.

5. Metals Reduction: The dried catalyst is subjected to a hydrogen-containing reduction gas to reduce the metals. During this stage, the reactor temperature is raised to about 700-900° F. (371-482° C.).

Following the period of time during which the catalyst undergoes oxidation in order to remove coke on the catalyst, the reactor is depressurized, and the catalyst is extensively cooled, typically to about 400° F. (204° C.). Then, prior to catalyst reduction, water and oxygen are thoroughly purged from the catalyst bed(s) by circulating an inert gas through the beds over a period of typically at least several hours. During the metal reduction step, the catalyst is initially contacted with hydrogen at the cooled temperature, and the reactor temperature is then increased, typically by at least about 400° F., to promote catalyst reduction.

The time required for cooling the reactor to around 400° F. (204° C.), and the time required for re-heating the reactor to reducing conditions, both add a total additional twenty-four (24) hours or more to prior art catalyst regeneration processes. In addition, the pressure drop during this step necessitates the reforming unit compressor be turned off.

In addition, during regeneration, halogens (e.g., Cl) present in the system form corrosive by-products, such as HCl. During this entire time for cooling and then re-heating the reactor, the reforming equipment is typically unprotected from the corrosiveness of HCl. Conventional methods for regenerating reforming catalyst typically take at least several days to complete, during a substantial portion of which the reforming equipment is susceptible to damage by the corrosive by-products.

There is a continued need for improved processes for reforming catalyst regeneration that are effective, less time-consuming, simpler, and which minimize the potential for damage to the reforming equipment, thereby providing major operating economies for integrated hydrocarbon reforming/catalyst regeneration processes, as compared with processes of the prior art.

US2010/0152021 to Lew ('021 to Lew), published Jun. 17, 2010, describes a reforming catalyst regeneration process wherein following the rejuvenation step, the reactor is cooled from about 950° F. (510° C.) to preferably 850° F. (454° C.) with the compressor running. The nitrogen "purge" decreases the oxygen content to around 1-2 volume percent oxygen. The pressure of the reactor is decreased to a preferred 70 psig, then hydrogen is injected, combusting the oxygen. Thereafter, the reactor pressure is increased to a preferred 170 psig. By raising the drying stage temperature and pressure, this eliminates the need to turn off the compressor, and shortens the time needed to raise the reactor temperature to the temperatures needed for the reduction step.

As noted above, when introducing hydrogen following the drying step described in '021 to Lew, the residual oxygen is combusted. Because the combustion of oxygen in the presence of hydrogen is an exothermic reaction, it was thought necessary to both reduce the oxygen content to below 0.5 volume percent, and limit the temperature rise while the oxygen is being consumed (by limiting the amount of hydrogen being introduced).

It has now been found that by initiating the metals reduction step before achieving a 1-2 volume percent oxygen level, and by introducing the hydrogen at a higher rate, results in improved catalyst performance once the catalyst has been fully regenerated.

SUMMARY OF THE INVENTION

The present invention is directed to a process for regenerating a reforming catalyst within a reactor by:

(a) removing a carbon containing deposit from the reforming catalyst, (b) contacting the reforming catalyst with oxygen under catalyst rejuvenation conditions to provide a rejuvenated catalyst, (c) purging a portion of the oxygen from the rejuvenated catalyst such that residual oxygen is retained within the reactor, and (d) introducing hydrogen into the reactor at a rate to provide a reactor temperature increase in the range from 25 to 45° F.

BRIEF DESCRIPTION OF THE DRAWINGS

The FIGURE is a diagram of a conventional reforming operation.

DETAILED DESCRIPTION OF THE INVENTION

Catalytic reforming of naphtha feedstocks is an important industrial process, for example, in petroleum refining for producing high octane gasoline. The reforming reactions are typically catalyzed by reforming catalysts comprising porous supports, such as alumina, that have dehydrogenation promoting metal components impregnated or mixed therewith.

During commercial operation, the activity of the reforming catalyst gradually declines (deactivates) to an extent that eventually necessitates catalyst regeneration. The deactivated catalyst will have a carbon containing deposits thereon. The carbon containing deposit may be referred to herein as "coke" and may represent up to about 25 wt. % or more of the deactivated catalyst. Prior to catalyst regeneration, the hydrocarbon feed to the reforming reactor will be interrupted, and residual feed will be flushed from the reactor.

In conventional catalyst regeneration processes, which are lengthy processes typically performed over a period of more than one week, the equipment is prone to damage, e.g., due to prolonged exposure to corrosive hydrochloric acid. Therefore, the regeneration process described herein, which requires substantially less time to complete, are highly advantageous as compared with prior art processes. The instant processes also afford a major economic advantage of a much shorter downtime for the catalytic reforming phase.

In contrast to conventional reforming catalyst regeneration processes, in the catalyst regeneration process as disclosed herein, the reforming unit is only partially purged of oxygen, at relatively high temperature and pressure, following catalyst oxidation. In an embodiment, such partial purging of oxygen may provide a defined minimum concentration of residual oxygen that remains in the reactor and in contact with the catalyst after the partial purging step has been completed. Hydrogen is then introduced to combine and combust with the residual oxygen, so as to affect a controlled increase in catalyst temperature and to reduce the catalyst.

In further contrast to conventional processes, in catalyst regeneration processes as disclosed herein the catalyst may be subjected to relatively minor changes in temperature and pressure after catalyst oxidation and prior to purging. As a result, much less time is required for cooling and then reheating the catalyst to catalyst reducing conditions, as compared with conventional processes. Accordingly, catalyst regeneration processes as disclosed herein may shorten the downtime of reforming equipment by many hours if not several days, as compared with the prior art.

Catalyst regeneration processes may be performed, at least in part, in the presence of HCl. As an example, during steps that involve the introduction of oxygen into the catalyst bed, e.g., the coke burning and catalyst rejuvenation steps, HCl or chlorinated organic compounds may also be introduced into the reactor. In an embodiment, the amount of such HCl or chlorinated compounds added to the reactor may be adjusted so as to maintain the chlorine content of the catalyst within a suitable range, e.g., in the range from about 0.5 to 2.0% Cl.

During steps that involve the introduction of oxygen into the catalyst bed, a neutralization (e.g., caustic or soda ash) solution may be circulated through the reactor(s), e.g., to protect the metal from HCl. However, after the catalyst rejuvenation step has been completed, the neutralization solution may be removed, e.g., drained, from the reactor(s); after which time metal components may be largely unprotected from HCl until the feed in stage, i.e., after the catalyst regeneration process per se has been completed.

Accordingly, it is highly advantageous to complete the catalyst regeneration process as rapidly as possible after the catalyst rejuvenation step. In this regard, the process disclosed herein allows the post-rejuvenation steps of the regeneration process to be completed in less than half the time of conventional processes (e.g., less than 20 hours for embodiments of the invention versus more than 40 hours for conventional regenerations processes).

Factors involved in decreasing the duration of post-rejuvenation steps of the present regeneration process may include the use of much higher temperatures and pressures prior to and during the $O_2/H_2$ transition, including the step of partially purging oxygen from the rejuvenated catalyst. Therefore less time is needed to lower, and then subsequently raise, the temperature and pressure in order to attain conditions that are effective for catalyst reduction. Furthermore, because of the relatively high temperature during the $O_2/H_2$ transition, much less water is taken up by the catalyst as compared with conventional processes; thus the catalyst dry out phase is much shorter, thereby further decreasing downtime of the reforming unit.

As a further advantage of the process described herein, the compressor for pressurizing the reactor(s) may be operated continuously during the catalyst regeneration process, thereby eliminating problems associated with equipment shutdown and restart. All of the gaseous materials supplied to the reactor during the regeneration process may be supplied via the feed compressor.

Coke Burn

The reforming catalyst regeneration process of the present invention includes the step of removing carbon containing deposits from the reforming catalyst. The coke deposits may be removed from the reforming catalyst by burning or combustion of the deposits. The coke deposits may be initially burned in the presence of a circulating gas stream comprising predominantly an inert gas, such as nitrogen, together with a lesser amount of oxygen. In one embodiment, a circulating gas stream for burning coke deposits from the catalyst has an oxygen concentration up to about 3%, or up to about 2%. In another embodiment, removal of the coke deposit may involve both primary and secondary coke burning steps, which may use different oxygen concentrations, as described hereinbelow.

This step may be accomplished using gas streams with varying concentrations of oxygen and flow rates.

Completion of the coke burning step(s) may be confirmed by monitoring the gas stream exiting the reactor outlet for changes in $CO_2$ content over time.

Catalyst Rejuvenation (Oxidation)

After the carbon containing deposits have been removed from the reforming catalyst, the catalyst will be contacted with an oxygen-containing gas stream under catalyst rejuvenation conditions to provide rejuvenated catalyst. While not being bound by any one theory, catalyst rejuvenation may involve platinum oxidation or oxychlorination, and platinum dispersion or re-dispersion on an alumina or other support material.

The oxygen-containing gas stream used to rejuvenate the catalyst will have an oxygen concentration higher than the gas stream used for removing the coke deposits from the catalyst. The oxygen-containing catalyst rejuvenation gas stream has an oxygen concentration in the range from 4 to 10% volume percent oxygen, preferably from about 5 to 9% volume percent oxygen. The catalyst rejuvenation temperature is at least 850° F., typically in the range from about 900 to 1025° F., or from about 925 to 975° F. The catalyst rejuvenation pressure is not less than 100 psig, and is typically in the range from 120 to 220 psig, or more typically from 130 to 170 psig.

Oxygen Purge

The rejuvenated catalyst may be cooled, and the pressure may be decreased to a level below the rejuvenation pressure, prior to purging a portion of the oxygen from the rejuvenated catalyst. In one embodiment, the pressure is decreased, e.g., by only about 40 to 60% of the rejuvenation pressure, to a pressure in the range from 50 to 100 psig; and the temperature may be decreased only moderately, e.g., by only about 75 to 125° F., below the rejuvenation temperature. In one embodiment, the temperature is decreased to not less than 825° F. prior to partially purging oxygen from the rejuvenated catalyst.

Only a portion of the oxygen is purged from the reactor following the rejuvenation step, such that a greater than normal amount of residual oxygen is retained in the reactor upon termination of the purging step, thus decreasing the oxygen purge cycle length of time. Purging of oxygen from the rejuvenated catalyst is interrupted or terminated when a defined amount of residual oxygen is retained within the reactor. As a non-limiting example, the residual oxygen concentration that is retained within the reactor is defined by the oxygen concentration in effluent purge gas from the reactor outlet.

During the step of partially purging oxygen from the reactor, the oxygen concentration in the effluent purge gas from the reactor may be monitored so that when the oxygen has been purged to below a defined minimum residual oxygen concentration, the purging process can be terminated. For example, the purging step may be terminated when the oxygen level in the effluent purge gas is at a suitable target residual oxygen concentration.

The reforming reactor is purged to a residual oxygen concentration within the range from 0.25 to 4% volume percent. In one subembodiment, the reforming reactor is purged to a residual oxygen concentration within the range from 0.3 to 1.0% volume percent. In another subembodiment, the reforming reactor is purged to a residual oxygen concentration within the range from greater than 2% to 4.0% volume percent. The step of purging oxygen from the rejuvenated catalyst to a suitable residual oxygen concentration is completed at a temperature of greater than 825° F.

The defined minimum concentration of residual oxygen in the reactor may be pre-selected at a level sufficient to prevent any premature or inadvertent catalyst reduction prior to contacting the catalyst with hydrogen gas. Any such inadvertent or premature catalyst reduction prior to the introduction of hydrogen gas into the reactor, which could occur gradually or slowly, may result in inferior characteristics and performance of the regenerated catalyst.

Advantageously, by preventing premature or inadvertent catalyst reduction in this way, higher temperatures may be used during regeneration steps prior to contacting the catalyst with hydrogen. The use of a higher temperature during the oxygen to hydrogen transition substantially decreases the length of time required to complete the catalyst regeneration process.

Metals Reduction

After the reforming reactor has been purged to a suitable residual oxygen concentration, hydrogen is introduced into the reactor. The hydrogen containing gas may be introduced into the reactor so as to provide an increase in pressure, generally to a pressure of at least about 120 psig, and typically to a pressure in the range from about 120 to 220 psig, or preferably from about 130 to 170 psig.

The introduction of hydrogen is initiated or commenced at a temperature greater than 825° F. Consequently, reduction occurs much more rapidly when the hydrogen gas is first introduced into the reactor, as compared with prior art processes wherein hydrogen is introduced when the reactor is at about 400° F. Applicant has observed that a more rapid onset of catalyst reduction may provide regenerated catalyst with superior reforming characteristics. While not being bound by theory, rapid catalyst reduction may prevent agglomeration or re-agglomeration of dispersed metal (e.g., Pt) on the catalyst support, thereby providing superior catalyst regeneration.

Furthermore, since the temperature does not drop below 825° F. between the rejuvenation and reduction stages, catalyst uptake of water generated as a result of the oxidation stage is substantially reduced compared to prior art catalyst regeneration methods that employing a 400° F. oxygen purge step, thus reducing the post-regeneration catalyst dry out period from 2-4 days to 1-2 days.

The hydrogen gas is introduced into the reactor such that the hydrogen combusts to generate heat, resulting in a marked increase in reactor temperature. The rate at which the hydrogen is introduced into the reactor is adjusted to control the increase in reactor temperature during the metals reduction step. In one embodiment, the rate at which the hydrogen is introduced into the reactor is adjusted to provide a reactor temperature increase in the range from 25 to 45° F. In one subembodiment, the hydrogen flow rate is adjusted to provide an increase in reactor temperature of 30 to 40° F.

Such an increase in reactor temperature may be fully realized within about 15 minutes from the commencement of the introduction of the hydrogen into the reactor. In a subembodiment, the increase in catalyst temperature may be fully realized within about 10 minutes, or within about 5 minutes, from the commencement of the introduction of the hydrogen gas into the reactor.

The increase in reactor temperature resulting from the combination of introduced hydrogen with the residual oxygen may be temporary, such that the internal reactor temperature may return to a value at or about the "cooled" purge temperature, e.g., the temperature of the reactor prior to the introduction of hydrogen. Thereafter, the introduction of hydrogen gas into the reactor may be continued so as to increase the pressure, and the reactor internal temperature may be increased, e.g., via one or more heaters or furnaces; and the catalyst may be maintained in the presence of the hydrogen containing gas under catalyst reducing conditions to provide a regenerated catalyst.

The reducing conditions are conducted at a temperature in the range from 900 to 1050° F., preferably from 925 to 975° F., and a pressure in the range from 120 to 220 psig, preferably from 130 to 170 psig. The catalyst may be maintained under catalyst reducing conditions for a time period generally in the range from about 4 to 12 hours, or from about 5 to 8 hours.

In contrast to conventional reforming catalyst regeneration processes, the catalyst regeneration process disclosed herein may be completed in the absence of a further oxidation step subsequent to the catalyst rejuvenation step; and furthermore, such process may be performed in the absence of a reduction step prior to the introduction of the hydrogen into the reactor. That is to say, the improved regeneration process as disclosed herein does not require withholding treatment of the catalyst with hydrogen until after catalyst oxidation has been completed; and furthermore, such regeneration processes do not require treatment of the catalyst with oxygen after catalyst reduction.

The compressor for pressurizing the reactor is operated continuously during the entire process, such that the reactor maintains a pressure during the entire process of not less than 70 psig, preferably not less than about 50 psig.

Reforming catalyst regenerated according to process described herein will typically have a hydrocarbon reforming activity level not less than about 95% that of the fresh reforming catalyst from which it was derived.

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

What is claimed is:

1. A process for regenerating a reforming catalyst in a reforming reactor, comprising: (a) removing a carbon containing deposit from the reforming catalyst; (b) contacting the reforming catalyst with oxygen under catalyst rejuvenation conditions; (c) purging only a portion of the oxygen from the rejuvenated catalyst such that residual oxygen is retained within the reactor; and (d) introducing hydrogen into the reactor at a rate to provide a reactor temperature increase in the range from 25 to 45° F.

2. The process of claim 1, wherein the increase in reactor temperature during step (d) occurs within 15 minutes of the commencement of step d).

3. The process of claim 2, wherein the increase in reactor temperature during step (d) occurs within 10 minutes of the commencement of step d).

4. The process of claim 1, wherein the step of contacting the reforming catalyst with oxygen under catalyst rejuvenation conditions comprises contacting the reforming catalyst with an oxygen-containing gas stream having an oxygen concentration of between 4 and 10 volume percent.

5. The process of claim 1, wherein the step of contacting the reforming catalyst with oxygen under catalyst rejuvenation conditions is conducted at a temperature of at least 850° F.

6. The process of claim 1, wherein the step of contacting the reforming catalyst with oxygen under catalyst rejuvenation conditions is conducted at a pressure of not less than 100 psig.

7. The process of claim 1, wherein the step of contacting the reforming catalyst with oxygen under catalyst rejuvenation conditions is conducted at a pressure of 120 to 220 psig.

8. The process of claim 1, further comprising the step of decreasing the reactor temperature of not less than 825° F. prior to the step of purging only a portion of the oxygen from the rejuvenated catalyst.

9. The process of claim 1, wherein the process is conducted at pressure of not less than 70 psig.

10. The process of claim 1, wherein the step of introducing hydrogen into the reactor is conducted at a temperate in the range of from 900 to 1050° F.

11. The process of claim 10, wherein the step of introducing hydrogen into the reactor is conducted at a pressure in the range from 120 to 220 psig.

12. The process of claim 11, wherein the step of introducing hydrogen into the reactor is conducted using a hydrogen flow rate to provide an increase in reactor temperature of 30 to 40° F.

* * * * *